United States Patent
Ricketts (10) Patent No.: US 7,844,480 B2
(45) Date of Patent: Nov. 30, 2010

(54) METHOD AND SYSTEM FOR PLANNING AND MANAGING MULTIPLE PROJECTS ON DEMAND WITH CRITICAL CHAIN AND REPLENISHMENT

(75) Inventor: John A. Ricketts, Clarendon Hills, IL (US)

(73) Assignee: International Business Machines Corporation, Armonk, NY (US)

( * ) Notice: Subject to any disclaimer, the term of this patent is extended or adjusted under 35 U.S.C. 154(b) by 1008 days.

(21) Appl. No.: 11/046,373

(22) Filed: Jan. 27, 2005

(65) Prior Publication Data

US 2006/0167732 A1 Jul. 27, 2006

(51) Int. Cl.
G06F 9/44 (2006.01)

(52) U.S. Cl. .......................................... 705/8
(58) Field of Classification Search ............... 705/7, 705/8, 9
See application file for complete search history.

(56) References Cited

U.S. PATENT DOCUMENTS

| | | | | |
|---|---|---|---|---|
| 4,937,743 | A * | 6/1990 | Rassman et al. | 705/8 |
| 5,414,809 | A * | 5/1995 | Hogan et al. | 715/765 |
| 5,548,506 | A * | 8/1996 | Srinivasan | 705/8 |
| 5,563,994 | A * | 10/1996 | Harmon et al. | 345/440 |
| 5,671,361 | A | 9/1997 | Brown et al. | |
| 5,680,530 | A * | 10/1997 | Selfridge et al. | 345/440 |
| 5,704,028 | A * | 12/1997 | Schanel et al. | 345/440 |
| 5,754,873 | A * | 5/1998 | Nolan | 715/235 |
| 5,826,252 | A * | 10/1998 | Wolters et al. | 707/1 |
| 5,913,201 | A * | 6/1999 | Kocur | 705/9 |
| 5,969,706 | A * | 10/1999 | Tanimoto et al. | 345/671 |
| 5,973,694 | A * | 10/1999 | Steele et al. | 715/835 |
| 5,982,383 | A * | 11/1999 | Kumar et al. | 345/440 |
| 6,036,345 | A * | 3/2000 | Jannette et al. | 700/97 |
| 6,249,774 | B1 * | 6/2001 | Roden et al. | 705/28 |
| 6,252,596 | B1 * | 6/2001 | Garland | 715/810 |
| 6,426,761 | B1 * | 7/2002 | Kanevsky et al. | 715/788 |

(Continued)

FOREIGN PATENT DOCUMENTS

JP    2004227269 A  *  8/2004

OTHER PUBLICATIONS

"A Variation in Understanding", Morgan, The TQM Magazine, Bedford: Feb. 1993, vol. 5, Iss. 1; p. 39, 5 pages.*

(Continued)

*Primary Examiner*—Romain Jeanty
(74) *Attorney, Agent, or Firm*—Scully, Scott, Murphy & Presser, P.C.; William E. Schiesser (57) ABSTRACT

Disclosed are a method, system and computer program for managing multiple projects. The method comprises the steps of defining a plurality of projects requiring resources, each of said projects having a project manager; and managing said resources with resource buffers and replenishment times. Said replenishment times are incorporated by said project manager, into resource view plans for said plurality of projects. The preferred embodiment of the invention employs a technique called Replenishment to manage resources when Critical Chain (CC) is used on diverse projects. This embodiment of the invention overcomes problems with the Strategic Resource approach by (1) not requiring identification of a common strategic resource, (2) providing heuristics to determine how much spare capacity to provide for each resource type, and (3) allowing projects to be started or completed on demand.

21 Claims, 4 Drawing Sheets

U.S. PATENT DOCUMENTS

| | | | |
|---|---|---|---|
| 6,437,758 B1* | 8/2002 | Nielsen et al. | 345/8 |
| 6,570,567 B1* | 5/2003 | Eaton | 345/428 |
| 6,581,040 B1* | 6/2003 | Wright et al. | 705/8 |
| 6,594,535 B1* | 7/2003 | Costanza | 700/97 |
| 6,594,696 B1* | 7/2003 | Walker et al. | 709/223 |
| 6,621,509 B1* | 9/2003 | Eiref et al. | 715/836 |
| 6,678,698 B2* | 1/2004 | Fredell et al. | 707/104.1 |
| 6,704,034 B1* | 3/2004 | Rodriguez et al. | 715/860 |
| 6,714,829 B1* | 3/2004 | Wong | 700/101 |
| 6,714,936 B1* | 3/2004 | Nevin, III | 707/102 |
| 6,731,309 B1* | 5/2004 | Unbedacht et al. | 715/765 |
| 2002/0078205 A1* | 6/2002 | Nolan | 709/225 |
| 2002/0123916 A1* | 9/2002 | Godin et al. | 705/7 |
| 2003/0125996 A1* | 7/2003 | Bush et al. | 705/7 |
| 2004/0117046 A1* | 6/2004 | Colle et al. | 700/99 |
| 2004/0133889 A1* | 7/2004 | Colle et al. | 718/100 |
| 2004/0158568 A1* | 8/2004 | Colle et al. | 707/100 |
| 2005/0159990 A1* | 7/2005 | Barrett | 705/8 |
| 2006/0085291 A1* | 4/2006 | Yoshida et al. | 705/28 |
| 2007/0058650 A1* | 3/2007 | Ricketts | 370/412 |

OTHER PUBLICATIONS

"A Variation in Understanding", Morgan, The TQM Magazine, Bedford: Feb. 1993, vol. 5, Iss. 1; p. 39, 5 pages.*

A. Speiser, et al., "Multiple Projects Management in LAN Environment", *IBM Technical Disclosure Bulletin*, vol. 38, No. 03, pp. 379-382; Mar. 1995; and.

A. Speiser, et al., "Distributed Tasks Scheduling", *IBM Technical Disclosure Bulletin*, vol. 38, No. 02, pp. 555-558; Feb. 1995.

* cited by examiner

FIG. 2
REPLENISHMENT FOR SERVICES

FIG. 3
CRITICAL CHAIN PROJECT PLAN WITH REPLENISHMENT

METHOD AND SYSTEM FOR PLANNING AND MANAGING MULTIPLE PROJECTS ON DEMAND WITH CRITICAL CHAIN AND REPLENISHMENT

BACKGROUND OF THE INVENTION

1. Field of the Invention

This invention generally relates to methods and systems for managing multiple projects. In a preferred embodiment, the invention relates to a method and system for planning and managing multiple projects on demand. More specifically, this preferred embodiment provides a new technique for coordinating multiple projects and the resources required to perform them when those resource requirements vary substantially across projects.

2. Background Art

Diverse projects are common in large technical and professional services businesses, such as information technology management, business process outsourcing, and consulting, because such services are highly customized to individual customer requirements. But diverse projects can occur even in standardized services and product-based businesses, such as manufacturing and distribution, if a firm has multiple lines of business or multiple product lines. And diverse projects can occur within a program, which is a set of related projects that achieve more when managed together.

Critical Chain Project Management

The Critical Chain (CC) project management method was originally a method for planning and managing an individual project [Critical Chain by Eliyahu Goldratt, North River Press, 1997]. Though controversial, CC can overcome weaknesses inherent in the older yet more-widely used Critical Path (CP) project management method. Table I below shows similarities and differences between Critical Path and Critical Chain project management methods.

TABLE I

| | Critical Path (CP) | Critical Chain (CC) |
|---|---|---|
| Tasks are estimated with . . . | 90% confidence in every task | 50% confidence only around the critical chain |
| Contingency time is planned . . . | | |
| Resource contention is . . . | often ignored | managed |
| Resource leveling affects . . . | non-critical tasks | all tasks |
| Work rules allow . . . | bad multi-tasking | no bad multi-tasking |
| Planned duration is usually . . . | greater than CC | less than CP |
| Early starts on gating tasks are . . . | encouraged | discouraged |
| Late task completions . . . | accumulate | do not accumulate |
| Re-planning is done . . . | frequently | rarely |
| Progress is tracked against . . . | milestones | time buffer penetration |
| Late project completion occurs . . . | often | seldom |

Overall, if CC principles are followed faithfully, CC projects are likely to finish earlier than CP projects of equivalent scope because CC eliminates unnecessary contingency from task estimates, actively manages resource contention, and applies work rules that substantially decrease the probability of late project completion. For instance, bad multi-tasking (assigning a resource to more tasks than can be completed in a given time) is common in CP, but prohibited in CC. Furthermore, if multiple projects are staggered (without resource contention) rather than concurrent (with resource contention), some of those projects will be completed much earlier with CC management than with CP management.

Multi-Project Critical Chain

CC has been extended for planning and managing multiple projects via a technique that schedules projects based on the limited availability of the Strategic Resource (SR) [*Project Management in the Fast Lane* by Robert Newbold, St. Lucie Press, 1998; *Critical Chain Project Management* by Lawrence Leach, Artech House, 2000]. The SR is often (1) chronically in short supply, (2) not readily available from outside sources, and (3) slow to develop internally. If not, one resource is designated as the SR and deliberately understaffed to ensure that the constraint does not shift to another resource type. The SR is also known as the "Drum Resource" because it sets the pace for all projects. That is, projects are scheduled (staggered) by creating inter-project dependencies between tasks performed by the SR on various projects. For instance, if Information Technology Architects are the SR because there are not enough to staff all available projects, multiple projects are scheduled according to this technique so that IT Architects can progress from project to project with minimal delay. Effective use of this technique, however, requires that (1) the SR is known, (2) all other resource types have enough spare capacity so that they rarely if ever become the constraint and thereby cause the SR to become idle, and (3) project sponsors are willing to wait for their project to start based on SR availability.

Unfortunately, requirement #1 is quite difficult to satisfy as project diversity increases, and project diversity is often highest when projects are performed for outside clients rather than internal groups. There simply may be no single SR type, across a portfolio of diverse projects, and if so, this technique cannot be effectively applied to the entire portfolio. In such circumstances, it may be possible to identify the SR that applies within a class of projects, and schedule each class accordingly. But this does not address resource contention between project classes. So the tendency is to revert to scheduling each project independently, even though they compete for resources, which in turn contributes to cross-project multi-tasking and the other undesirable effects that multi-project CC was designed to eliminate.

Requirement #2 is likewise difficult to satisfy if all resource types are managed toward maximum utilization. A central tenet of CC is that both project and enterprise productivity are maximized when non-strategic resources have some spare capacity—even though this may seem counter-intuitive. With education, it is possible to get workers, managers, and executives to buy into lower utilization targets for non-strategic resources. But like requirement #1, this presumes that a common SR exists across projects, which may not be the case, as shown earlier. Furthermore, the SR technique lacks algorithms or heuristics for computing spare capacity needs for non-strategic resources, which makes education and buy-in difficult.

Finally, requirement #3 is impossible to satisfy whenever approval for a project depends on the ability to start it on demand. If a project start is delayed, project sponsors generally assume that project completion will be delayed by at least as much. With CC, this is not necessarily the case because project durations can be significantly shorter, thereby more than making up the delay relative to the equivalent CP-managed project duration. Nevertheless, project sponsors tend to perceive delayed starts as being unresponsive to their needs, which generally works against project approval. Ironically, on large, complex projects, the project executive (PE) may be the constraint because he/she has customer relationship responsibility in addition to project/program oversight. But the conventional SR approach does not address this possibility because (1) the PE performs no tasks on the CC and (2)

availability of a suitable PE typically constrains only the start of the project/program, not the duration of any tasks.

Projects On Demand

The SR approach is based on the assumptions that (1) an organization's resource capacity is essentially fixed, and (2) the challenge is to prioritize, plan, and manage projects in a manner that uses that fixed capacity to complete the projects that create the most value. Fixed capacity is a reasonable assumption for many organizations, particularly those performing internal projects, but there are organizations whose resource capacity is relatively variable and within which it may be impossible to unbalance capacity toward a common SR.

For example, global service providers, who are in the business of performing projects for others, do not operate with fixed capacity. They have relatively elastic resource capacity, except in the short run, via subcontractors, business partners, acquisitions, and employees, including those rebadged from their previous employer as part of an outsourcing contract. Some global service providers complete thousands of projects annually and use over 100,000 resources from various sources. Beyond the short run, however, the constraint for global service providers is external, in the market for their services, rather than in their resources.

Customers of such enterprises want projects completed on demand rather than when their projects fit the service provider's schedule. Clearly then, there is need for a multi-project planning and management technique that allows CC to be used when the requirements for the SR technique cannot be met—and would not be appropriate if they could.

SUMMARY OF THE INVENTION

An object of this invention is to provide an improved technique for managing resources across a portfolio of diverse projects.

Another object of the invention is to provide an improved method and system for planning and managing projects on demand.

Another object of the present invention is to provide a system for managing resource buffers and tuning CC-based project schedules accordingly.

A further object of this invention is to communicate information between Project Managers and Resource Managers so as to better manage resources that are used for multiple projects.

Another object of the invention is to use Replenishment for Services, in methods and systems for managing multiple service projects, to reduce the need for additional resources by maintaining buffers of resources with skills most likely to be needed unexpectedly.

These and other objectives are attained with a method and system for managing multiple projects. The method comprises the steps of defining a plurality of projects requiring resources, each of said projects having a project manager; and managing said resources with resource buffers and replenishment times. Said replenishment times are incorporated by said project manager, into resource view plans for said plurality of projects.

The preferred embodiment of the invention employs a technique called Replenishment to manage resources when Critical Chain (CC) is used on diverse projects. This embodiment of the invention overcomes the problems with the Strategic Resource approach discussed above, by (1) not requiring identification of a common SR, (2) providing heuristics to determine how much spare capacity to provide for each resource type, and (3) allowing projects to be started or completed on demand.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
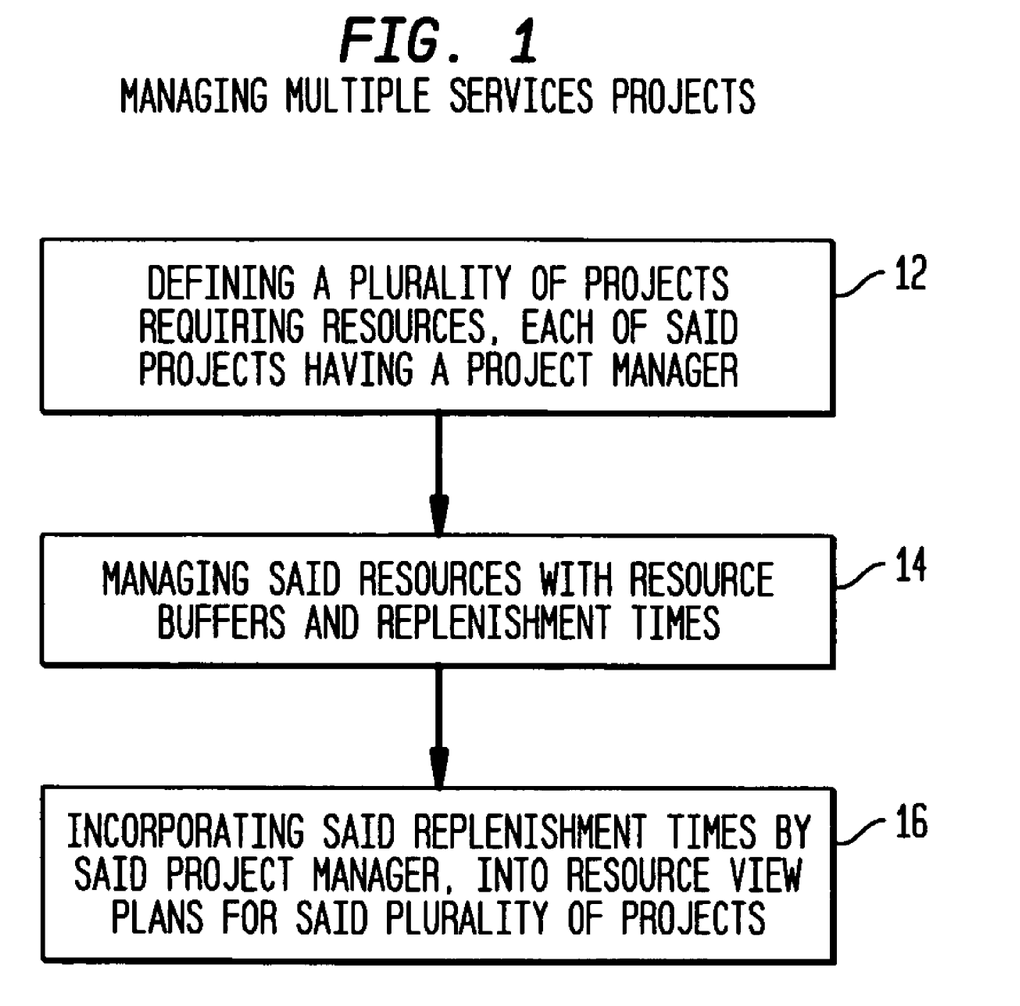
FIG. 1 is a flow chart showing a preferred implementation of the present invention.

The present invention relates to a method and system for managing multiple projects. With reference to FIG. 1, the method comprises the step 12 of defining a plurality of projects requiring resources, each of said projects having a project manager; and the step 14 of managing said resources with resource buffers and replenishment times. At step 16, said replenishment times are incorporated by said project manager, into resource view plans for said plurality of projects.

The preferred embodiment of the invention employs a technique called Replenishment to manage resources when Critical Chain (CC) is used on diverse projects. This embodiment of the invention overcomes the problems with the Strategic Resource approach discussed above, by (1) not requiring identification of a common SR, (2) providing heuristics to determine how much spare capacity to provide for each resource type, and (3) allowing projects to be started or completed on demand.

Replenishment

Replenishment was originally a method for planning and managing the distribution of manufactured goods [*It's Not Luck*, by Eliyahu Goldratt, North River Press, 1994]. Contrary to conventional inventory management, which periodically pushes large shipments of inventory through the distribution system in anticipation of sales, Replenishment ships small quantities at much shorter intervals, largely in response to the pull of actual sales. Furthermore, centralized inventory exploits the statistical phenomenon of aggregation, which says that variability is significantly less at a central warehouse than at any distributed warehouse or retail location. Since the objective is to hold just enough inventory to cover all sales during the time needed to manufacture and distribute more goods, longer manufacturing and distribution time and higher sales volatility require larger inventories. However, Replenishment typically has the dual benefit of reducing total inventory while at the same time reducing stock-outs—two goals that are usually in conflict. By convention, inventories under Replenishment are called "buffers" to emphasize that they provide a buffer against uncertainty.

Replenishment for Services

Replenishment has been adapted for use in technical and professional services ["System and Method for Managing Capacity of Professional and Technical Services," Patent Application Publication 2003/0125996A1]. Some facets of Replenishment for services are directly analogous to Replenishment for goods. For instance, contrary to conventional resource management, which often hires in anticipation of sales due to long hiring and training lead times, Replenishment for services acquires resources in response to actual sales. Furthermore, centralizing resource pools, rather than hiring and training for individual projects, exploits the statistical phenomenon of reduced volatility via aggregation. Longer hiring and training lead time and higher sales volatility require larger resource buffers, but the overall benefits are fewer idle resources and fewer open positions—two goals that are usually in conflict.

Despite these similarities between Replenishment for goods and Replenishment for services, there are also some fundamental differences. Table II shows some of these differences.

TABLE II

| Replenishment for . . . | goods | services |
| --- | --- | --- |
| Thing being replenished is . . . | physical items | skilled resources |
| Production can be done . . . | in advance | only after service request |
| Stock-outs cause . . . | back-orders | lost or late projects |
| Supply and demand are . . . | independent | coupled |
| Target buffers are based on . . . | total consumption during replenishment time | net consumption during replenishment time |
| Buffer size equals . . . | entire inventory | fraction of total resources |
| Buffer zones are . . . | unidirectional | bidirectional |
| Buffer management means . . . | ordering more goods | increasing or decreasing resources |

When goods are sold, returns are the exception, not the rule. Conversely, when resources are deployed to projects, returns are the rule, not the exception. That is, resources return to the pool of available resources after their tasks on a project are finished. Thus, supply of and demand for resources are coupled. Net resource consumption is new demand minus returning supply, and the result can be positive, negative, or zero. So unlike inventory, where the target buffer size is based on total units sold during time to re-supply, target resource buffers are based on net consumption during time to acquire more resources—and the resulting buffer size is just a fraction of total resources. Also in contrast to inventory, where a low buffer triggers action, but a high buffer level triggers no action, resource buffer zones are bidirectional. That is, the objective is to have neither too many nor too few resources. Whereas declining sales of goods leave inventory at or near its target buffer level, declining sales of services causes resource buffers to rise to unaffordable levels. Thus resource management must be able to trigger decreases as well as increases in the actual resource buffer level, for example, by not replacing resources lost through normal attrition or by replacing subcontractors with employees on some projects.

Figure 2:
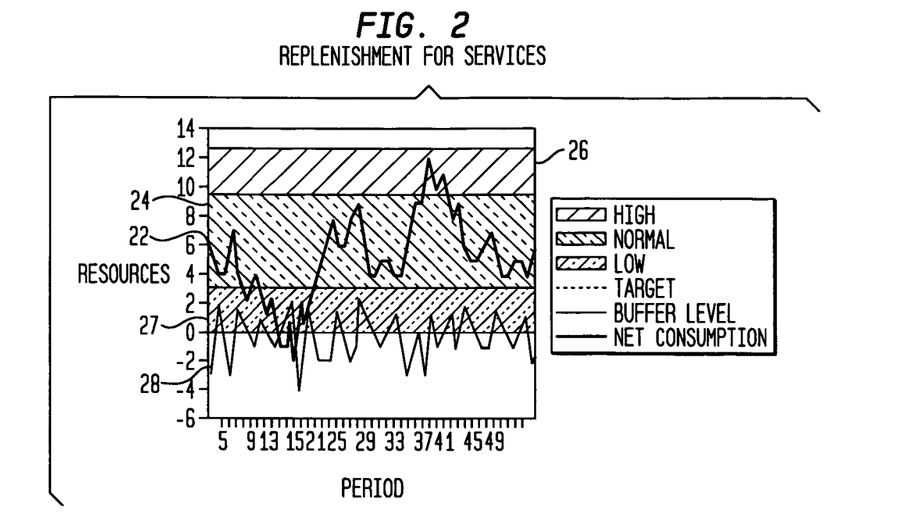
FIG. 2 illustrates how Replenishment works for one resource pool.

FIG. 2 illustrates how Replenishment works for one resource pool. In a global service provider, there may be hundreds of such pools, also called skill groups, each having anywhere from a handful to thousands of resources. Any available member of a resource pool can be deployed to a project requiring that skill. And resources revert to being available when their tasks are complete. For the pool as a whole, net consumption during any period can be positive, negative, or zero. When it is positive, the buffer level drops. When negative, the level rises. The target buffer 22 is based on net consumption during the average time it takes to acquire more resources. This replenishment time does not necessarily equate to hiring and training new employees. It may be just the time needed to find a suitable subcontractor (i.e., days instead of months). For skills that are available virtually on demand, the target buffer can be zero. But for a skill that takes time to replenish, the target buffer must be some positive value.

Surrounding that target buffer is the normal variability zone 24. No action is taken while the buffer level is in the normal zone, but when that level rises into the high zone 26, that is a signal to consider shedding some resources, and when the buffer level drops into the low zone 28, that is a signal to consider gaining resources. If the buffer level drops to a negative value, some resource requests cannot be fulfilled immediately because the buffer has been depleted. The zones can be calibrated for different levels of sensitivity by making them wider or narrower. A normal zone that is one standard deviation above and below the target will cover about 68% of the variance in net consumption. However, the zones do not have to be symmetric. If depleting the buffer for a scarce resource has a huge impact on revenue and profit but the cost of an idle resource is relatively small, the low-zone threshold may be raised. Likewise, if it takes a long time to replace a scarce resource, the high-zone threshold may be raised as well. But regardless of how the buffer is sized and the zone thresholds are set, when replenishment time or variability of net consumption change, the target buffer and buffer zones are preferably adjusted accordingly.

Replenishment for services does not depend on the source of demand for resources. A process, for instance, is a set of activities performed continuously or on a frequently recurring schedule with no final completion date, such as operating a data center or call center, providing maintenance or technical support, and processing payroll or tax returns. In contrast, a project is a set of finite-duration tasks that must be performed in a specified sequence to produce a desired result within a prescribed time and budget. Resource requirements for a process are driven by the volume of work flowing through the process, and most resources have long-term assignments. On the other hand, resource requirements for a project are driven by the specific tasks within scope, so most resources have short-term assignments. Yet Replenishment for services is as applicable to processes as projects, and whether those projects are planned and managed with Critical Path or Critical Chain makes no difference to Replenishment.

The preferred embodiment of this invention extends Critical Chain so that it interlocks with Replenishment for services by:

1. Reconciling buffer concepts between resource managers (RM) and project managers (PM);

2. Incorporating resource constraints and replenishment times into CC project plans;

3. Communicating resource needs in project plans from PM to RM for buffer management;

4. Handling resources not managed via Replenishment, if any;

5. Resolving resource constraints by exploiting leverage points.

Resource Buffers

Conventional Critical Chain project plans built by project managers (PM) typically contain "resource buffers" and may contain "strategic resource buffers," but those elements serve entirely different purposes from the resource buffers managed by a resource manager (RM) in Replenishment for services, as described above. In particular, in any conventional CC plan, resource buffers are just reminders sent by the PM to each assigned resource in advance of the time their first tasks on the project are scheduled to start. These reminders do buffer the project from inattentiveness. These reminders will be referred to herein as "reminders" to avoid confusion with resource buffers as implemented in Replenishment for services. Also, in a conventional CC plan for multiple projects, strategic resource buffers are time scheduled ahead of the strategic resource's first tasks on each project to ensure that all those tasks' predecessors can be completed before the strategic resource arrives. This is to keep the SR busy because its utilization determines the throughput of all projects. However, this invention is for scheduling multiple projects when there is no SR, so strategic resource buffers are irrelevant.

Figure 3:
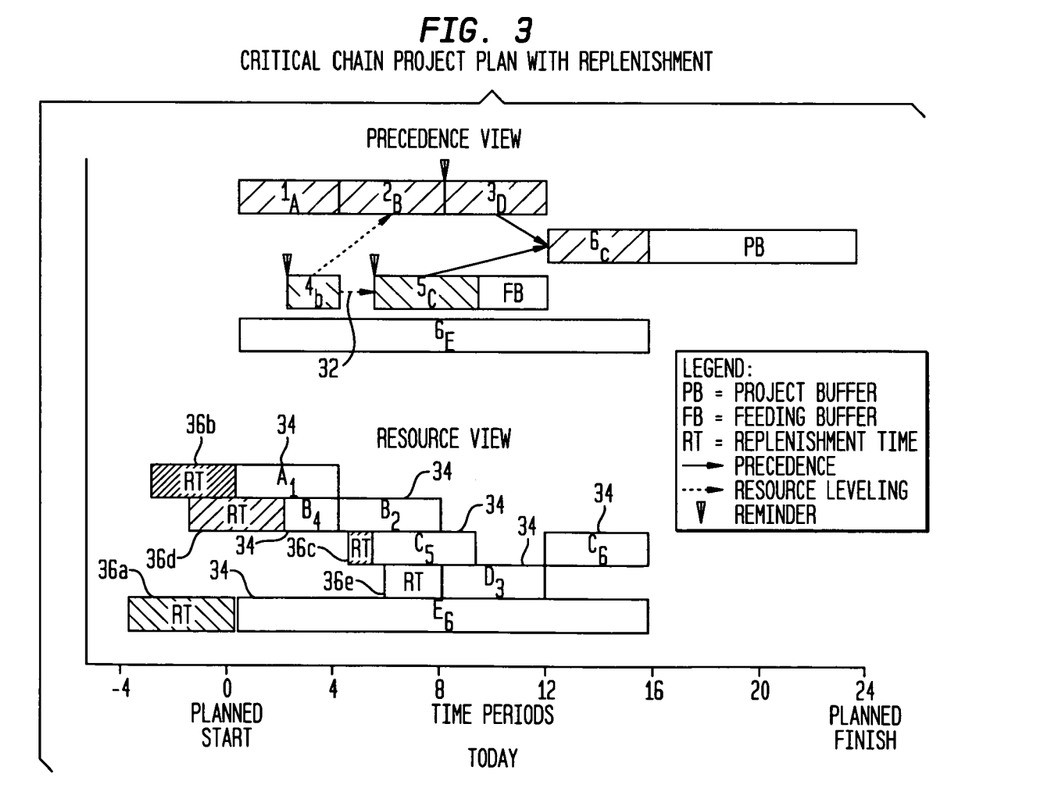
FIG. 3 shows a simple project CC plan including both a Precedence View and a Resource View.

Resource buffers as implemented in Replenishment for services can be incorporated into a single-project CC plan as illustrated in the Resource View within FIG. 3. But since the Precedence View drives the Resource View, the Precedence View will be discussed first.

The Precedence View is interpreted as follows. Tasks 1, 2, 3, and 6 are the Critical Chain because they are the shortest path through the project after resource contention is eliminated. (The subscripts indicate which resource type is assigned to each task.) Tasks 4 and 5 are a Feeding Chain, from which the CC is buffered by the Feeding Buffer (FB). That is, this Feeding Chain will have no impact on the project finish date unless Task 5 finishes later than Task 3, an outcome which the FB is designed to prevent. To avoid bad multitasking by resource B, task 4 is scheduled to start earlier than a strict precedence approach would dictate, thereby creating a gap 32 in the Precedence View but eliminating bad multitasking that would otherwise appear in the Resource View. The planned project finish date is at the far right in FIG. 3. The Project Buffer (PB) preceding the finish date is the time against which overall progress will be measured and managed by the PM. So long as the cumulative delay from late task completion does not exceed the PB, the project will finish on time or early. And if CC work rules are followed faithfully, there is about a 0.5 probability this project will finish by period 16, but over a 0.9 probability it will finish by period 24. Task 6, performed by the PM, would not ordinarily be shown in the Precedence View because (1) it is neither on the CC nor a Feeding Chain and (2) its duration is entirely dependent on the other tasks. It is included in this discussion because it creates a resource requirement—and in this example it could delay the start of the project.

Resource View

In a conventional project plan, the Resource View shows when each resource type is scheduled to perform a task. For example, boxes 34 in FIG. 3 show five resources, A through E. (Subscripts indicate which tasks each resource is assigned.) If this plan had not been resource-leveled as called for by CC, this view would also show overlapping tasks for resource B.

The preferred embodiment of the invention uses Replenishment Times (RT) to create linkage between the RM view of resource buffers and the PM view of how resource constraints may impact the project plan. For example, RT box 36a ahead of resource E may be shown in bright red to indicate that this resource buffer is depleted, and this box indicates that the expected RT is currently four periods long. Therefore, this resource requirement should be submitted at least that many periods before the planned project start, otherwise the project could start late. The RT boxes 36b and 36c ahead of resources A and C may be shown in green to indicate that their resource buffer levels are normal (or high), so these resources could be assigned anytime, and their RT would have no effect. RT box ahead of resource B may be shown in red to indicate that its resource buffer is low but not depleted. Although this resource starts on a non-critical task, it is nevertheless noteworthy because failure to request this resource in advance of the project start could have a ripple effect that delays task 2, which is critical.

RT 36e ahead of resource D may be shown in yellow to indicate that its resource buffer is currently low or depleted, but, as can be seen from FIG. 3, its RT is short enough and far enough in the future that no action is required now. If that buffer is not replenished by the time the current time approaches the leading edge of this RT 36e, this RT will turn from yellow to red to alert the PM and RM to an impending resource constraint. On the other hand, if that buffer is replenished, this RT 36e will turn from yellow to green, thereby indicating no resource constraint.

As resource buffer levels rise and fall, any of the RT boxes may change color (status) and length while the project is under way. But once a resource is assigned, the corresponding RT disappears from the Resource View because it is no longer relevant. For a given resource type, however, there will be an RT block in the project plan every time another instance of that type is required.

At this point, some key differences between the Precedence View and the Resource View should be noted. First, Reminders in the Precedence View (called "resource buffers" in conventional CC) are typically of fixed duration unrelated to the availability of resources. In contrast, RT boxes in the Resource View (as implemented with Replenishment) are variable duration directly related to the availability of resources. Furthermore, through its color, the RT may or may not represent an actual resource constraint. In addition, whereas conventional Critical Chain and Critical Path methods have somewhat different Precedence Views (for instance, CC requires resource leveling, but CP does not), they have virtually the same Resource Views. Hence, this invention, like Replenishment for services, is an option for Critical Path, but it is a necessary addition to multi-project Critical Path if the SR method is not practical.

Strategic Resource versus Replenishment

Figure 4:
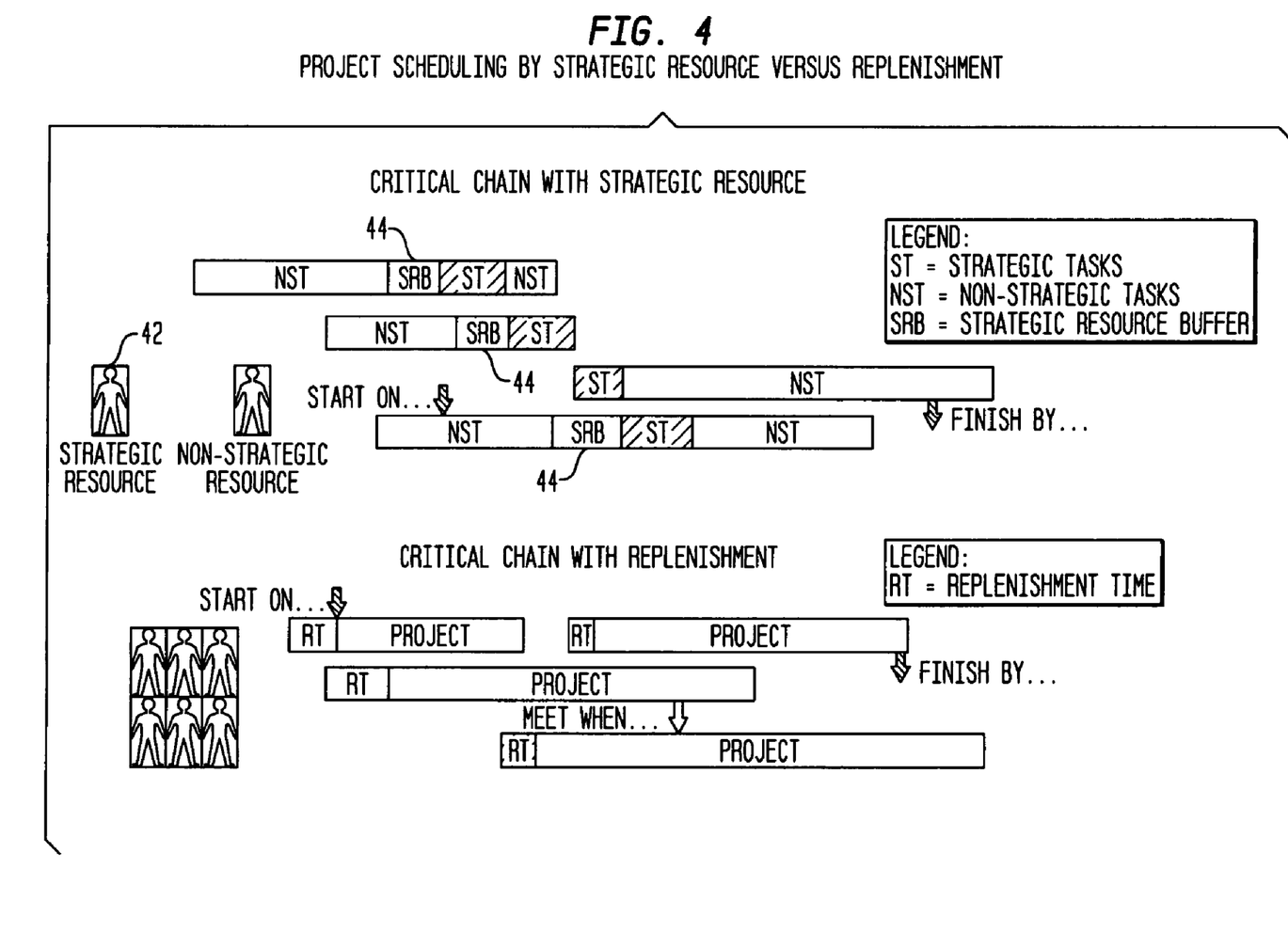
FIG. 4 shows a comparison of the Strategic Resource (SR) method of scheduling multiple projects to Replenishment.

FIG. 4 compares the Strategic Resource (SR) method of scheduling multiple projects to Replenishment. As noted earlier, under the SR method, projects are staggered based on availability of the SR 42, and strategic resource buffers 44 are inserted to prevent preceding tasks from finishing late enough to delay the SR. Since capacity of the SR is limited, if not fixed, it may not be possible to meet project sponsors' requests for projects to start on or finish by specific dates (assuming such projects would be feasible if adequate resources were available). The SR is thus the constraint both for projects and the enterprise.

Under Replenishment, projects are scheduled according to project sponsor requests (assuming such projects are feasible), and if there are insufficient resources, they are replenished as needed. Any resource type (skill group) can be a project constraint in the short run, but in practice, commodity skills are rarely a constraint. And beyond the short run, the market is the constraint for the enterprise.

System

Figure 5:
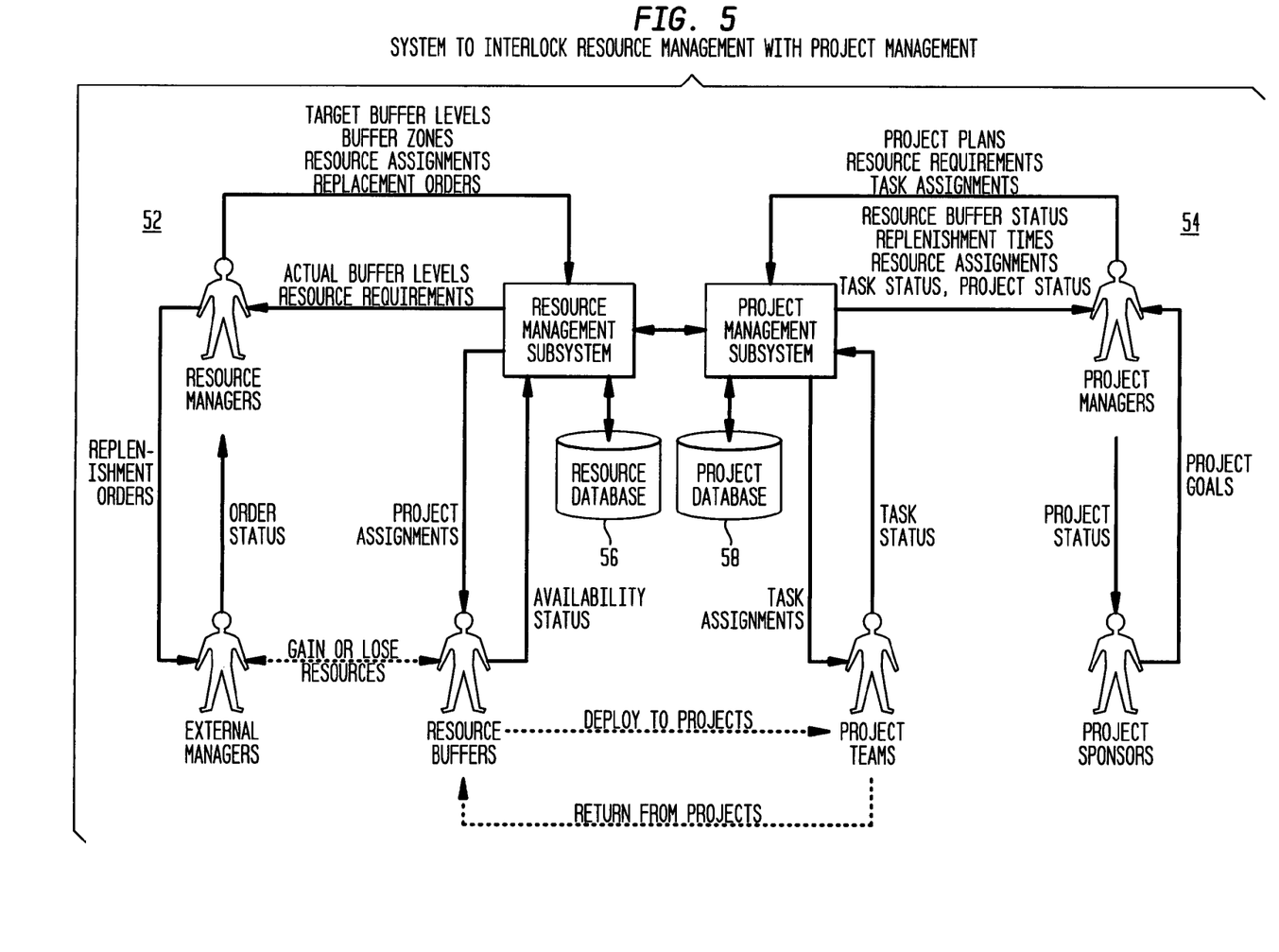
FIG. 5 illustrates how information and resources may flow through a system having both resource management and project management.

The information that is shared between RMs and PMs is substantial enough that this invention is preferably implemented in a computer system unless there are only a few resource pools and simple projects. FIG. 5 illustrates how information (solid lines) flows through such a system, and how resources (dashed lines) flow in response to that information. The Resource Management and Project Management Subsystems 52 and 54 share information from their respective databases 56 and 58 in order to integrate Critical Chain and Replenishment.

Although entire project plans may be kept in the project database, only a relatively small slice of each project's data is actually required for Replenishment each period. Since the timing of distant tasks is highly uncertain, communicating resource requirements beyond 1.5 times the longest RT is generally unnecessary. In the example discussed in connection with FIG. 3, this would mean that only resource requirements within the next 6 periods would need to be communicated. Furthermore, Replenishment is driven by actual requirements, not forecasts.

If a resource type is not managed via Replenishment, which is much like having a resource buffer level perpetually at zero, its RT is, preferably, always colored red in the Resource View of the project plan, and its length is based on an estimate unless better information is available. Having resources not managed via Replenishment occurs most often when they are provided by the project sponsor rather than the global service provider. Although it is possible to turn such an RT into a time buffer following the tasks assigned to the resource (like a Feeding Buffer), this could lengthen the project schedule unnecessarily, so it is not a preferred approach.

Anytime a red RT could delay the project start or otherwise delay the CC, there is cause for concern because the RT represents an average and the actual RT could be longer. Nevertheless, the RM and PM have many leverage points to consider, so a resource constraint will not necessarily impact the project.

For example, these concerns can be addressed in one or more of the following ways. The RM can (1) assign a resource already in the pipeline who will arrive sooner than the RT, (2) expedite a resource from a source with short RT, (3) redeploy a resource currently assigned to another project on non-critical tasks, (4) substitute an available resource from another pool with compatible skills, (5) assign a fractional resource who has less than a full-time assignment elsewhere. The PM can (1) suspend or truncate a non-critical task and reassign its resource to a critical task suffering the resource constraint, (2) split the constrained task and assign each part to a different resource so they can be completed concurrently when resources become available, (3) authorize overtime to make up a delay, (4) shift responsibility from the sponsor to the service provider or vice versa, depending on who has available resources, (5) do nothing because a FB or the PB can absorb the delay, (6) do nothing because the project sponsor is changing project scope or due date, thereby necessitating a more significant change in the plan.

The net result of a system embodying a preferred embodiment of this invention is that multiple projects can be completed on demand because resource constraints are managed both at the enterprise and project levels. With the preferred embodiment, there is no need to stagger project schedules or deliberately unbalance capacity, as in the SR approach, because Replenishment adjusts capacity in response to demand. With the preferred embodiment of this invention, there is need, however, to incorporate Replenishment information into project plans to enable resource constraint management, and there is need to link the Resource Database to the Project Database.

As indicated hereinabove, it should be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized.

The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A computer implemented method of managing and coordinating multiple projects and resources for said projects, the method comprising the steps of:

defining a plurality of projects, each of the projects including a multitude of tasks and requiring a multitude of types of service resources, each of said types of service resources having a resource buffer identifying a supply of resources of said each type of service resources, and a replenishment time, said replenishment time being an average time needed to acquire a defined amount of resources of said each type of service resources;

managing said service resources with the resource buffers and the replenishment times; and generating, by using a computer, a display on a display screen of the computer, showing both a precedence view and a resource view for one of the projects, said precedence view including visual representations of the multitude of tasks of said one of the projects; and for each of said multitude of tasks, one of the types of service resources needed to perform said each task; and said resource view including a visual representation of when each of a group of types of service resources is scheduled to perform one of the tasks represented in the precedence view; and for each of said group of types of service resources, a single visual indicator indicating both a status of the resource buffer for said each of said types of service resource, and the replenishment time for said each of said types of service resources, thereby creating a linkage between the precedence view and the resource view to show visually how resource constraints impact plans for said one of the projects.

2. A computer implemented method according to claim 1, wherein:
a resource manager is the source of said replenishment times; and
said replenishment times are conveyed to a project manager.

3. A computer implemented method according to claim 1, wherein:
each of said resource buffers includes a quantity of resources; and
said managing step includes the step of, if the quantity of resources in one of said buffers strays outside a defined range, then adjusting said quantity of resources in said one of said resource buffers.

4. A computer implemented method according to claim 1, wherein said managing step includes the steps of:
assigning resources to said projects according to requests from said project managers; and
if, as a result of said assigning, resources in one of said resource buffers decreases below a defined level, replenishing said resources of said one of said resource buffers.

5. A computer implemented method according to claim 1, wherein:
each of said resource buffers includes a quantity of resources; and
said incorporating step includes the steps of for each of at least some of said resource buffers,
i) showing a display of said resource buffer in said resource view, and
ii) using said display of said resource buffer to indicate a status of said quantity of resources in said buffer and an amount of time needed to replenish said quantity of resources in said buffer.

6. A computer implemented method according to claim 1, wherein:
each of said resource buffers has a normal variability zone, a high zone, and a low zone;
said managing step includes the steps of
i) when said resource buffer is in said high zone, removing resources from said resource buffer, and
ii) when said resource buffer is in said low zone, adding resources to said resource buffer.

7. A computer implemented method according to claim 1, wherein said generating step includes the steps of:
showing each of said resource buffers in said resource view in a color: and
using said color to represent said status of said set of resources in said each of said resource buffers.

8. A computer implemented method according to claim 1, wherein the Resource Management and the Project Management have respective databases, and the Resource Management and the Project Management share information from the respective databases in order to integrate Critical Chain project management and Replenishment project management.

9. The method according to claim 1, comprising the further steps of:
when the replenishment time of one of the types of service resources changes, adjusting the resource buffer of said one of the types of service resources; and
when one of the types of service resources is assigned to one of the tasks, removing from the resource view the visual indictor of the replenishment time for said one of the types of service resources; and wherein
each of the resource buffers has a high status, a low status, and a normal status; and
a project manager requests resources from a resource manager, and the project manager only requests from the resource manager resources that are needed within a given multiple of the longest of the replenishment times.

10. A computer system for managing and coordinating multiple projects and resources required for said projects, the computer system being configured for:
defining a plurality of projects, each of the projects including a multitude of tasks and requiring a multitude of types of service resources, each of said types of service resources having a resource buffer identifying a supply of resources of said each type of service resources, and a replenishment time, said replenishment time being an average time needed to acquire a defined amount of resources of said each type of service resources;
managing said service resources with the resource buffers and the replenishment times; and
generating, by using a computer, a display on a display screen of the computer, showing both a precedence view and a resource view for one of the projects,
said precedence view including visual representations of the multitude of tasks of said one of the projects; and for each of said multitude of tasks, one of the types of service resources needed to perform said each task; and
said resource view including
a visual representation of when each of a group of types of service resources is scheduled to perform one of the tasks represented in the precedence view; and
for each of said group of types of service resources, a single visual indicator indicating both a status of the resource buffer for said each of said types of service resource, and the replenishment time for said each of said types of service resources, thereby creating a linkage between the precedence view and the resource view to show visually how resource constraints impact plans for said one of the projects.

11. A computer system according to claim 10, wherein:
each of said resource buffers includes a quantity of resources; and
the computer system is configured for managing said resources by acting, if the quantity of resources in one of said buffers strays outside a defined range, to adjust said quantity of resources in said one of said resource buffers.

12. A computer system according to claim 10, wherein computer system is configured for managing said resources by:
assigning resources to said projects according to received requests; and
acting, if as a result of said assigning, resources in one of said resource buffers decreases below a defined level, for replenishing said resources of said one of said resource buffers.

13. A computer system according to claim 10, wherein:
each of said resource buffers includes a quantity of resources; and
the computer system is configured for incorporating said replenishment times by:
i) showing in said resource view a display of said quantity of resources in each of at least some of said resource buffers, and
ii) using said display of said resource buffer to indicate a status of said quantity of resources in said buffer and an amount of time needed to replenish said quantity of resources in said buffer.

14. A program storage device readable by computer, tangibly embodying a program of instructions executable by the computer to perform method steps for managing and coordinating multiple projects and resources required for said projects, said method steps comprising:

defining a plurality of projects, each of the projects including a multitude of tasks and requiring a multitude of types of service resources, each of said types of service resources having a resource buffer identifying a supply of resources of said each type of service resources, and a replenishment time, said replenishment time being an average time needed to acquire a defined amount to replenish some of the resources of said each type of service resources;

managing said service resources with the resource buffers and the replenishment times; and generating, by using a computer, a display on a display screen of the computer, showing both a precedence view and a resource view for one of the projects, said precedence view including visual representations of the multitude of tasks of said one of the projects; and for each of said multitude of tasks, one of the types of service resources needed to perform said each task; and said resource view including a visual representation of when each of a group of types of service resources is scheduled to perform one of the tasks represented in the precedence view; and for each of said group of types of service resources, a single visual indicator indicating both a status of the resource buffer for said each of said types of service resource, and the replenishment time for said each of said types of service resources, thereby creating a linkage between the precedence view and the resource view to show visually how resource constraints impact plans for the one of the projects.

15. A program storage device according to claim 14, wherein:

each of said resource buffers includes a quantity of resources; and said managing step includes the step of, if the quantity of resources in one of said buffers strays outside a defined range, then adjusting said quantity of resources in said one of said resource buffers.

16. A program storage device according to claim 14, wherein said managing step includes the steps of:

assigning resources to said projects according to requests from project managers; and if, as a result of said assigning, resources in one of said resource buffers decreases below a defined level, replenishing said resources of said one of said resource buffers.

17. A method of deploying a computer program product tangibly embodying a program of instructions executable by a computer for managing and coordinating multiple projects and resources required for said projects, wherein, when executed in the computer, the computer program performs the steps of:

defining a plurality of projects each of the projects including a multitude of tasks and requiring a multitude of types of service resources, each of said types of service resources having a resource buffer and a replenishment time, said replenishment time being an average time needed to acquire a defined amount of resources of said each type of service resources;

managing said service resources with the resource buffers and the replenishment times; and generating, by using a computer, a display on a display screen of the computer, showing both a precedence view and a resource view for one of the projects, said precedence view including visual representations of the multitude of tasks of said one of the projects; and for each of said multitude of tasks, one of the types of service resources needed to perform said each task; and said resource view including a visual representation of when each of a group of types of service resources is scheduled to perform one of the tasks represented in the precedence view; and for each of said group of types of service resources, a single visual indicator indicating both a status of the resource buffer for said each of said types of service resource, and the replenishment time for said each of said types of service resources, thereby creating a linkage between the precedence view and the resource view to show visually how resource constraints impact plans for the said one of projects.

18. A method according to claim 17, wherein:

each of said resource buffers includes a quantity of resources; and said managing step includes the step of, if the quantity of resources in one of said buffers strays outside a defined range, then adjusting said quantity of resources in said one of said resource buffers.

19. A method according to claim 17, wherein said managing step includes the steps of:

assigning resources to said projects according to requests from said project managers; and if, as a result of said assigning, resources in one of said resource buffers decreases below a defined level, replenishing said resources of said one of said resource buffers.

20. A method according to claim 16, wherein:

each of said resource buffers includes a quantity of resources; and said incorporating step includes the steps of for each of at least some of said resource buffers, i) showing a display of said resource buffer in said resource view, and ii) using said display of said resource buffer to indicate a status of said quantity of resources in said buffer and an amount of time needed to replenish said quantity of resources in said buffer.

21. A method according to claim 17, wherein:

said showing step includes the steps of (i) showing each of said resource buffers in said resource view plan with a visible spatial parameter, and (ii) using said spatial parameter to represent said amount of time.

* * * * *